T. CROSSLEY.
SPLIT COLLAR AND PULLEY.
APPLICATION FILED JULY 6, 1920.
1,382,481.
Patented June 21, 1921.
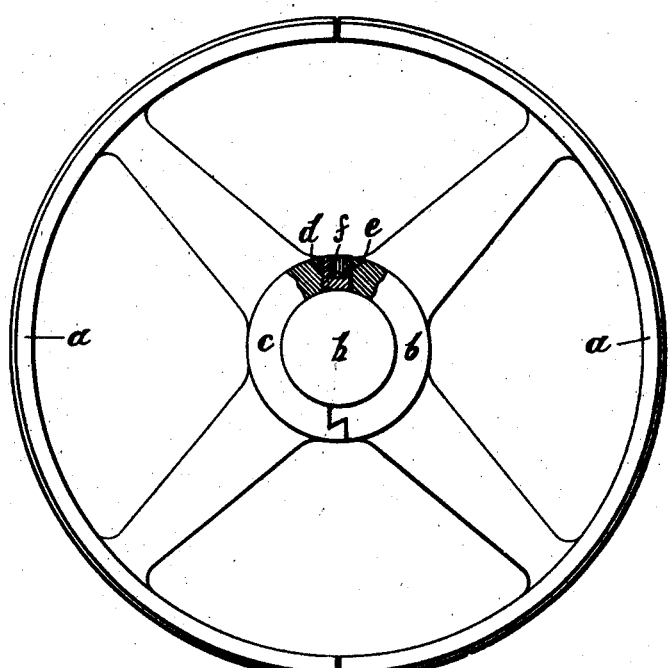
Fig: 1.
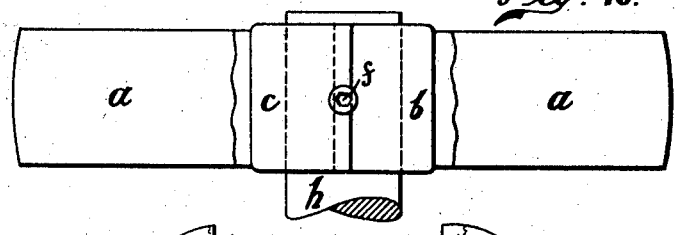
Fig: 2.
Fig: 3.   Fig: 4.
Inventor
Thomas Crossley
by Herbert W. Denner
Attorney.

UNITED STATES PATENT OFFICE.

THOMAS CROSSLEY, OF MANCHESTER, ENGLAND.

SPLIT COLLAR AND PULLEY.

1,382,481.     Specification of Letters Patent.     Patented June 21, 1921.

Application filed July 6, 1920. Serial No. 394,094.

*To all whom it may concern:*

Be it known that I, THOMAS CROSSLEY, subject of the King of Great Britain and Ireland, and resident of Manchester in the county of Lancaster, England, have invented certain Improvements in Split Collars and Pulleys, of which the following is a specification.

The present invention relates to split collars and pulleys and has for its object the provision of means for connecting the parts of such split collars or pulleys, so that they can be readily assembled and rigidly maintained in an operative position.

It has been proposed to construct a split pulley having two parts dovetailed together by conical projections upon one part, taking into similar recesses in the other, the abutting faces of the parts being of a curved shape, the parts being locked together by screws passing through the joint.

This invention relates to split pulleys of a similar type, inasmuch as projections of one part take into recesses in the other, but a simpler and improved form of projection is employed. One part is dovetailed into the other by means of stepped projections or recesses on the abutting parts, the sections being locked together by means of a set screw or screws passing through the center of the dovetail.

Further, the locking or binding screw or screws can be utilized to secure the collar or pulley boss to the shaft.

A sheet of drawings is appended whereon,

Figure 1 is a side elevation of a split pulley having a boss constructed in accordance with this invention.

Fig. 2 is a plan view showing a split collar constructed according to this invention in position on a shaft, and Figs. 3 and 4 show the left and right hand sections of a split collar according to this invention.

In a preferred construction, in reference to Fig. 1, the boss of the split pulley $a$ is built up from two sections of metal, wood or other equivalent material. The sections $b$ and $c$ are dovetailed with a groove or dowel across their center (as shown in relation to the split collar Figs. 3 and 4). These sections are bored and tapped at the center of the dovetailed joint $d$ and $e$ and a set screw $f$ is inserted to bind or lock the two sections together. It will be understood that the set screw $f$ engages with the screw thread cut in both sections. If desired two set screws can be employed, one at the top and the other at the bottom of the collar so that the sections are usually held together at both points of contact. The set screw can be of such length that it will bear against the shaft $h$ and frictionally hold the collar or boss $b$—$c$ in position on the said shaft $h$ which can be drilled and tapped to receive and engage the set screw.

What I claim as my invention and desire to secure by Letters Patent is:—

A device of the character described having a hole for engaging with a shaft, said device being formed of two similar sections having dovetailed joints which connect them together, said sections having also a screw-threaded hole extending through one of their joints and arranged radially of the center of the shaft hole, and a screw inserted in the said hole and operating to lock the sections together.

In testimony whereof I have hereunto set my hand in the presence of two witnesses.

THOMAS CROSSLEY.

Witnesses:
M. C. RAMSBOTTOM,
L. FAVELL.